(12) United States Patent
Matsui

(10) Patent No.: US 8,822,071 B2
(45) Date of Patent: *Sep. 2, 2014

(54) ACTIVE MATERIAL FOR RECHARGEABLE BATTERY

(75) Inventor: Masaki Matsui, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 241 days.

This patent is subject to a terminal disclaimer.

(21) Appl. No.: 13/281,694

(22) Filed: Oct. 26, 2011

(65) Prior Publication Data

US 2013/0108919 A1 May 2, 2013

(51) Int. Cl.
*H01M 6/04* (2006.01)

(52) U.S. Cl.
USPC ...... 429/188; 429/209; 429/218.1; 429/231.6

(58) Field of Classification Search
USPC ............................ 429/188, 218.1, 209, 231.6
See application file for complete search history.

(56) References Cited

U.S. PATENT DOCUMENTS

| 5,227,046 | A | 7/1993 | Murphy et al. |
|---|---|---|---|
| 5,480,744 | A | 1/1996 | Bai |
| 5,686,205 | A | 11/1997 | Bai |
| 7,195,703 | B2 | 3/2007 | Schroder et al. |
| 7,537,863 | B2 | 5/2009 | Eylem et al. |
| 7,736,805 | B2 | 6/2010 | Nazri et al. |
| 2004/0104130 | A1 | 6/2004 | Mosley et al. |
| 2005/0058903 | A1* | 3/2005 | Eylem et al. .................. 429/220 |
| 2011/0111304 | A1 | 5/2011 | Cui et al. |

* cited by examiner

*Primary Examiner* — Milton I Cano
*Assistant Examiner* — Jimmy K Vo
(74) *Attorney, Agent, or Firm* — Gifford, Krass, Sprinkle, Anderson & Citkowski, P.C.

(57) ABSTRACT

A magnesium battery includes a first electrode including an active material and a second electrode. An electrolyte is disposed between the first electrode and the second electrode. The electrolyte includes a magnesium compound. The active material includes an inter-metallic compound of magnesium and bismuth.

6 Claims, 4 Drawing Sheets

ACTIVE MATERIAL FOR RECHARGEABLE BATTERY

FIELD OF THE INVENTION

The invention relates to electrochemical devices such as batteries, in particular rechargeable batteries, such as a rechargeable battery with a magnesium-based electrode.

BACKGROUND OF THE INVENTION

Electrochemical cells generate current between an anode and a cathode separated by an electrolyte that supports a simultaneous flow of ions between the two electrodes. An external conductive material completes the circuit and allows the cells to power various devices.

Numerous materials have been explored for anodes that have a variety of positive effects and drawbacks. For rechargeable cells, metal hydride based anodes are currently the most widely employed. Lithium hydride materials are much superior to the prior cadmium based batteries due to environmental neutrality. The metal hydride batteries currently known have limited cycle life. Also, lithium hydride based anodes suffer from non-uniform deposition of lithium during the charging process generating dendritic lithium that may detract from full effectiveness of the cell. Other materials have been proposed to replace the lithium hydride based anodes, but none to date have successfully demonstrated sufficiently desirable combinations of cycle life, capacity, and reliability.

Improved electrode materials would be very useful in order to develop high capacity density batteries.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

Magnesium based batteries and processes for forming electrodes suitable for use in magnesium based batteries are provided. A battery is provided that includes a first electrode including an active material where the electrode is free of surface oxidation, a second electrode, and an electrolyte disposed between the first electrode and the second electrode, the electrolyte including a magnesium compound. The electrolyte is in electrochemical contact with the first electrode and the second electrode to form the battery. The active material includes an inter-metallic compound of magnesium and bismuth. In some embodiments, the first electrode includes bismuth. A first electrode is optionally an anode. An anode optionally includes a binder, an electrically conducting material, and the active material.

The second electrode optionally includes a cathode active material that shows electrochemical reaction at higher electrode potential than the first electrode. An active material in an anode or a cathode is optionally $Mg_3Bi_2$.

Also provided are processes of forming a material suitable for use as an electrode including placing a bismuth material in electrical contact with a magnesium material, and immersing the bismuth material and magnesium material in an organomagnesium electrolyte for a doping time. In the inventive processes the organomagnesium electrolyte comprises magnesium. Immersing forms a first electrode comprising an active material. A process optionally further includes removing the first electrode from the electrolyte after a doping time and rinsing the electrode. A process produces an electrode that is optionally free of surface oxidation.

An organomagnesium electrolyte is optionally a Gringard reagent, $Mg(EtBuAlCl_2)_2$, $PhMgCl—AlCl_3$, $EtMgCl$-$Et_2AlCl$, $Mg(ClO_4)_2$, $Mg(BF_4)_2$, $Mg(PF_6)_2$ $Mg(TFSI)_2$, $MgTf_2$, $Mg(BETI)_2$, $MgCl_2$, $MgBr_2$, $MgI_2$, $Mg(BOB)_2$, or combinations thereof.

A doping time is optionally 12 to 72 hours. The active material formed on the first electrode is optionally $Mg_2Bi_3$.

A process optionally includes forming an electrochemical cell such as a magnesium battery. Optionally a first electrode is electrically associated with a second electrode by a common electrolyte. A first electrode is optionally an anode.

DETAILED DESCRIPTION OF THE INVENTION

Figure 1:
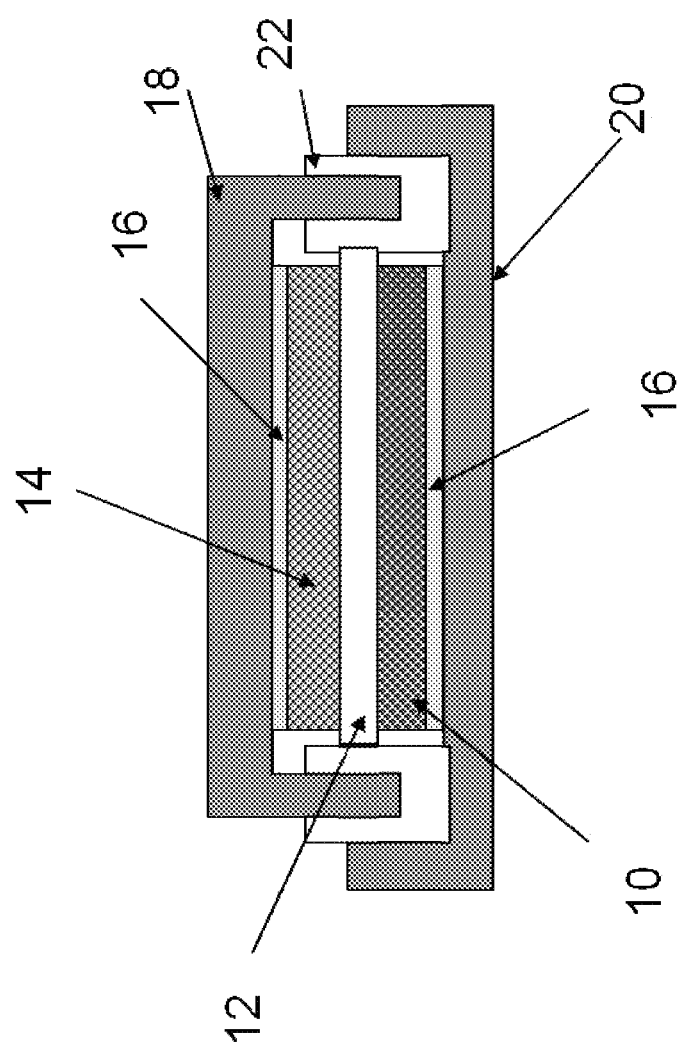
FIG. 1 is a diagram of a magnesium battery having a positive electrode containing a cathode active material and a negative electrode including a novel active material.

The following description of particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the process is described as an order of individual steps or using specific materials, it is appreciated that described steps or materials may be interchangeable such that the description of the invention includes multiple parts or steps arranged in many ways as is readily appreciated by one of skill in the art.

Among the numerous possible materials that may serve as an anode in an electrochemical cell, magnesium may be one of the most advantageous. A magnesium ion in a magnesium or magnesium ion battery carries two electrical charges, in contrast to the single charge of a lithium ion, which could provide a high capacity density to a magnesium based rechargeable battery. Prior attempts at forming a successful magnesium based anode have met with limited success in part due to oxidation that forms on the surface of the anode during production. The inventors describe novel magnesium-bismuth based electrodes that do not suffer from surface oxidation and rapid methods for their manufacture.

A material suitable for use as an electrode and methods of their manufacture are provided. The electrodes represent an improved system to address the problem of efficient electrical energy storage, particularly in a rechargeable system. The invention has utility as a method for the production of materials that provide improved storage and use of electrical energy. The electrode materials described herein provide high density energy storage, efficient reversibility, and high electrical efficiency. The materials also are useful in the formation of a battery that has long cycle life and deep discharge capability.

Some embodiments of the use for an electrode as described herein include electrochemical devices, such as batteries, in particularly rechargeable batteries and methods of producing novel electrodes that have utility in a rechargeable battery. Examples include magnesium-based batteries, and specifically to materials used as active materials within the electrodes of a magnesium based battery. Some embodiments include an electrode active material that includes bismuth. For example, the active material may include an inter-metallic compound of bismuth and magnesium. The improved active materials described herein may be used within the cathode and/or anode of an example battery.

In some embodiments, which are not intended to be limiting, an improved active material for a magnesium battery includes an intermetallic compound of bismuth and magnesium having the formula $Mg_3Bi_2$. Improved methods of producing a $Mg_3Bi_2$ electrode include immersing a bismuth material into an organomagnesium based electrolyte with Mg metal for a doping time. The $Mg_3Bi_2$ based electrode is free of an oxide layer thereby improving the performance of the electrode in a rechargeable battery.

A rechargeable magnesium battery is expected to be a high energy battery system, because of its high capacity density. In particular, as compared to lithium-ion batteries, the magnesium ion transfers two electrons per magnesium ion. However, there have previously been no good cathode or anode active materials that can fully utilize the advantage of the high capacity density. This is particularly true when a common electrolyte such as $Mg(ClO_4)_2$, $Mg(BF_4)_2$, $Mg(PF_6)_2$ or $Mg(TFSI)_2$ is desired.

In some embodiments, improved active materials including an intermetallic compound of bismuth and magnesium are used as the active material for a rechargeable battery. A particular example of an improved active material includes $Mg_3Bi_2$. The active material may further include an electrically conductive material and a binder. Examples of electrically conducting materials include carbon particles, such as carbon black. Exemplary binders include various polymers, such as PVdF, PTFE, SBR, or Polyimide.

FIG. 1 illustrates a magnesium-ion battery having an improved anode active material. The battery includes a positive electrode 10 including a cathode active material, an electrolyte layer 12, a negative electrode 14 containing the improved anode active material, current collector 16, negative electrode housing 18, positive electrode housing 20, and sealing gasket 22. The electrolyte layer 12 includes a separator soaked in electrolyte solution, and the positive electrode 10 is supported by the current collector 16. In this example, the negative electrode 14 includes an improved $Mg_3Bi_2$ active material.

The electrolyte layer may include a separator that helps maintain electrical isolation between the positive and negative electrodes. A separator may include porous sheet, nonwoven cloth, fibers, particles, web, or other form of material configured to reduce the risk of physical contact and/or short circuit between the electrodes. The separator may be a unitary element, or may include a plurality of discrete spacer elements such as particles or fibers. The electrolyte layer may include a separator optionally infused with an electrolyte solution. In some examples, for example using a polymer electrolyte or a solid state electrolyte, the separator may be omitted. A separator is optionally formed from polyethylene, polypropylene, polyethylene terephthalate (PET), methylcellulose, cellophane, woven or filtered nylon, polyvinyl acetate (PVA), microporous polypropylene, and combinations thereof.

The electrolyte may include a non-aqueous solvent, such as an organic solvent, and a salt of the active ion, for example a magnesium salt. Magnesium ions provided by the magnesium salt interact electrolytically with the active material(s). An electrolyte may be an electrolyte including or otherwise providing magnesium ions, such as a non-aqueous electrolyte including a magnesium salt. The electrolyte may include an organic solvent. Magnesium ions may be present as a salt or complex of magnesium, or as any appropriate form.

An electrolyte may include other compounds, for example additives to enhance ionic conductivity, and may in some examples include acidic or basic compounds as additives. An electrolyte may be a liquid, gel, or solid. An electrolyte may be a polymer electrolyte, for example including a plasticized polymer, and may have a polymer infused with or otherwise including magnesium ions. In some examples, an electrolyte may include a molten salt.

An electrode including an electrode having an $Mg_3Bi_3$ anode active material is optionally present as a sheet, ribbon, particle(s), or other physical form. Anode active materials optionally include materials that show an electrochemical reaction at a lower electrode potential than a cathode.

The active material is optionally supported by or otherwise in electrical contact with a current collector. A current collector optionally includes a metal or other electrically conducting sheet on which the electrode is supported. A metal sheet is optionally aluminum, copper, other metal, or alloy. In some examples, a metal housing may provide the function of a current collector. Other conducting materials, such as electrically conducting polymers, may be used as the current collector.

An electrode optionally includes a binder. A binder optionally includes any material capable of binding one or more of the electrode components. Many binders are known in the battery arts, for example various polymer binders are known and can be used.

Some embodiments include batteries having one or more cells, electrically connected in parallel and/or series, in any appropriate form such as button cells, other round cells, cylindrical cells, rectangular or other prismatic cells. A battery optionally includes forms such as a rolled-up battery form, and combinations of a battery with a supercapacitor and/or fuel cell, and the like.

The batteries of the present invention may be used in one or more of various electrically-powered apparatuses, such as consumer electronic devices, medical devices, electric or hybrid vehicles, or other apparatus including batteries.

Examples of the present invention include both primary (non-rechargeable, e.g. magnesium batteries) and secondary (rechargeable, e.g. magnesium ion) batteries. Specific examples include rechargeable magnesium-ion batteries. The term magnesium-based battery includes both primary and secondary batteries, i.e. both magnesium batteries and magnesium-ion batteries. Examples of the present invention include any magnesium-based battery, including rechargeable magnesium batteries having a capacity density greater than conventional lithium-ion rechargeable batteries.

Electrodes may be fabricated by any suitable method. For example, a paste may be formed of particles of the active material, a binder, and an electron-conducting material (e.g. graphitic carbon particles or carbon black). The paste may be deposited on an electrically conducting substrate, such as a current collector, and heat treated as necessary.

Also provided are processes for the preparation of a $Mg_3Bi_2$ material suitable for use as an electrode. The $Mg_3Bi_2$ electrode is free from surface oxidation thereby improving its performance and reversible capacity in conventional electrolytes relative to prior electrode materials. A process includes pre-doping a bismuth material with magnesium. A bismuth material is immersed or contacted with an organomagnesium electrolyte solution including magnesium metal for a doping time. Following a doping time, a $Mg_3Bi_2$ material suitable for use as an electrode is produced.

A doping time is optionally 12 hours or more. In some embodiments, a doping time is between 12 hours and 72 hours, or any value or range therebetween. Optionally, a doping time is from 24 to 48 hours. A doping time is optionally 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, or 48 hours.

An magnesium organohaloaluminate electrolyte solution suitable for use in the formation of an active material containing electrode optionally is a solution including one or more: Grignard reagents, illustratively EtMgCl, EtMgBr, PhMgCl, among others; complex organomagnesium electrolyte (e.g. $Mg(EtBuAlCl_2)_2$, $PhMgCl—AlCl_3$, $EtMgCl-Et_2AlCl$); molten salt containing Mg; or a common magnesium containing electrolyte such as $Mg(ClO_4)_2$, $Mg(BF_4)_2$, $Mg(PF_6)_2$ $Mg(TFSI)_2$, $MgTf_2$, $Mg(BETI)_2$, $MgCl_2$, $MgBr_2$, $MgI_2$, $Mg(BOB)_2$; among others; or combinations thereof.

A rinse step is optionally included in a process of producing a $Mg_3Bi_2$ material suitable for use as an electrode. A rinse step optionally includes flowing a rinse material over the surface of a doped $Mg_3Bi_2$ material. A rinse material is optionally an ether based solvent, illustratively, diethyl ether, dimethoxymethane, diethoxyethane, diglyme, triglime, tetrahydropyran, 1,3-Dioxolane, 1,4-Dioxane, 12-Crown 4-ether, or combinations thereof. Other aprotic non aqueous solvents are optionally used alone or in conjunction with an ether based solvent, illustratively, dimethyl carbonate, diethyl carbonate, propylene carbonate, acetonitrile, propio nitril, methyl acetate, ethyl acetate, gamma-butyrolactone, trimethylphosphate, triethylphosphate, or combinations thereof. In some embodiments a rinse material is tetrahydrofuran (THF).

Various aspects of the present invention are illustrated by the following non-limiting examples. The examples are for illustrative purposes and are not a limitation on any practice of the present invention. It will be understood that variations and modifications can be made without departing from the spirit and scope of the invention.

Example 1

Formation of an Active Material Electrode

A bismuth electrode is prepared by mixing a bismuth powder (Sigma-Aldrich, St. Louis, Mo.), acetylene black (Denka, Tokyo, Japan) and PTFE (Daikin America, Inc.) to obtain a paste. The obtained paste is pressed by roll press and punched 13 mm dia. The punched paste is pressed on to a stainless steel gauze #150 (Alfa Stainless, West Midlands, England). A solid magnesium foil of size (19 mm diameter) is obtained from (ESPI Metals, Ashland, Oreg.). The organomagnesium electrolyte (0.25M EtMg—Cl-$Et_2AlCl$ complex in THF) is prepared by mixing 2 ml of EtMgCl solution in THF (Sigma-Aldrich, St. Louis, Mo.), 1 ml of $Et_2AlCl$ (Sigma-Aldrich, St. Louis, Mo.) and 13 ml of THF(Sigma-Aldrich, St. Louis, Mo.).

Figure 2:
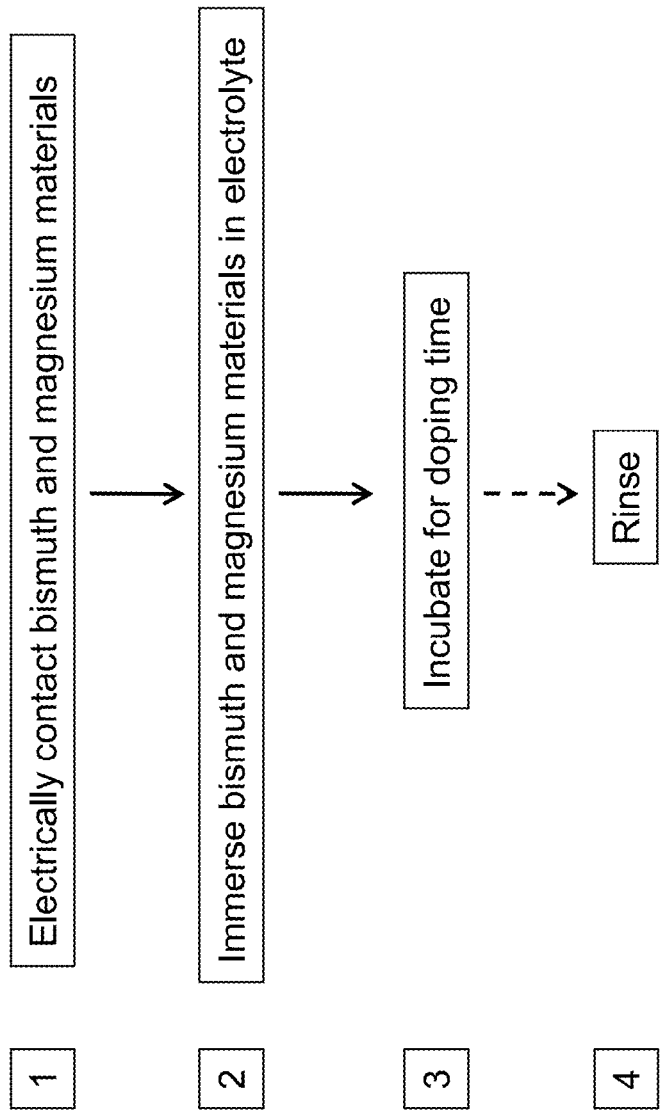
FIG. 2 is a schematic of a process of forming an electrode according to one embodiment of the invention.
Figure 3:
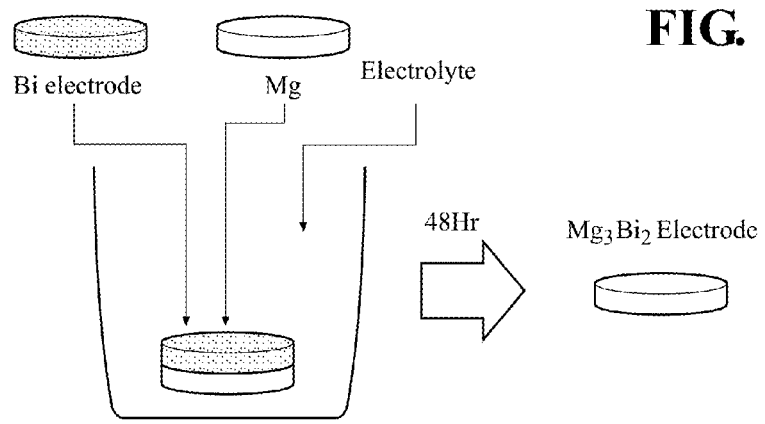
FIG. 3 is an illustration of a process of forming an electrode according to one embodiment of the invention.

An exemplary process of forming an electrode including an active material according to one embodiment is illustrated in FIGS. 2 and 3. The bismuth electrode is placed in electrical contact with the magnesium sheet by physical interactions between the two materials (1). Both sheets are then placed in a 50 ml beaker containing electrolyte (2). The beaker is confined in another container to avoid the evaporation of THF. The materials are incubated at room temperature in the electrolyte for 48 hours as a doping time (3). All of the processes are performed in Ar filled glove box.

Following the doping time, the bismuth electrode is removed from the electrolyte, and as an optional step, rinsed three times by flowing THF over both surfaces of the material (4). The resulting electrode is dried under vacuum for 30 minutes to remove any remaining THF from the surface. The electrode is stored in a 20 ml sample vial in the glovebox.

Example 2

Formation of an Electrochemical Cell Containing an Active Material Electrode

The electrochemical reversibility of the electrode of Example 1 is confirmed by cyclic voltammogram. A three electrode cell is employed for the electrochemical testing. The electrode of Example 1 is used as a working electrode, a silver-silver ion electrode as a reference electrode, and a Pt electrode for use as a counter electrode. The electrolyte is 1M $Mg(TFSI)_2$ in acetonitrile.

An improved process of fabricating a battery, such as a rechargeable magnesium-ion battery, includes providing first and second electrodes separated by an electrolyte, at least one electrode including bismuth and an inter-metallic of antimony and magnesium such as $Mg_3Sb_2$.

Example 3

Charge Density of Electrochemical Cell Incorporating Anode with Active Material

Figure 4:
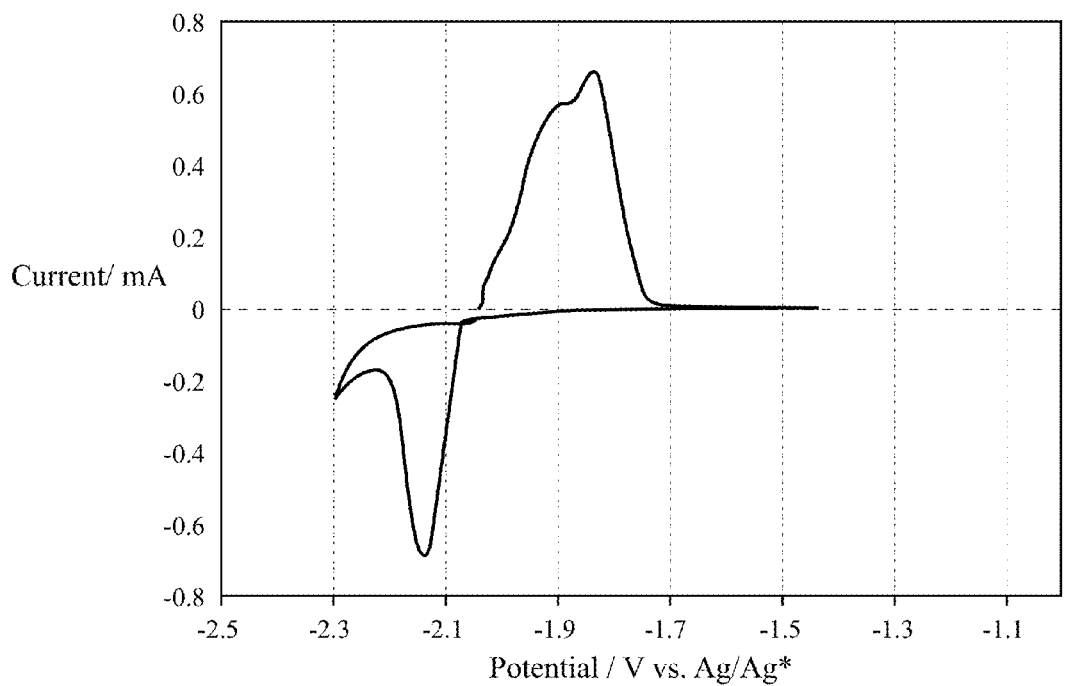
FIG. 4 is a slow scan cyclic voltammogram illustrating characteristics of an electrochemical cell incorporating an anode with a $Mg_2Bi_3$ active material according to one embodiment of the invention.

FIG. 4 is a slow scan cyclic voltammogram (SSCV) from an electrochemical cell formed as in Example 2 using an anode that is formed as in Example 1. An electrochemical cell that includes the pre-doped $Mg_2Bi_3$ electrode provides clearly reversible insertion/extraction of Mg at −2V vs. Ag/Ag+.

Figure 5:
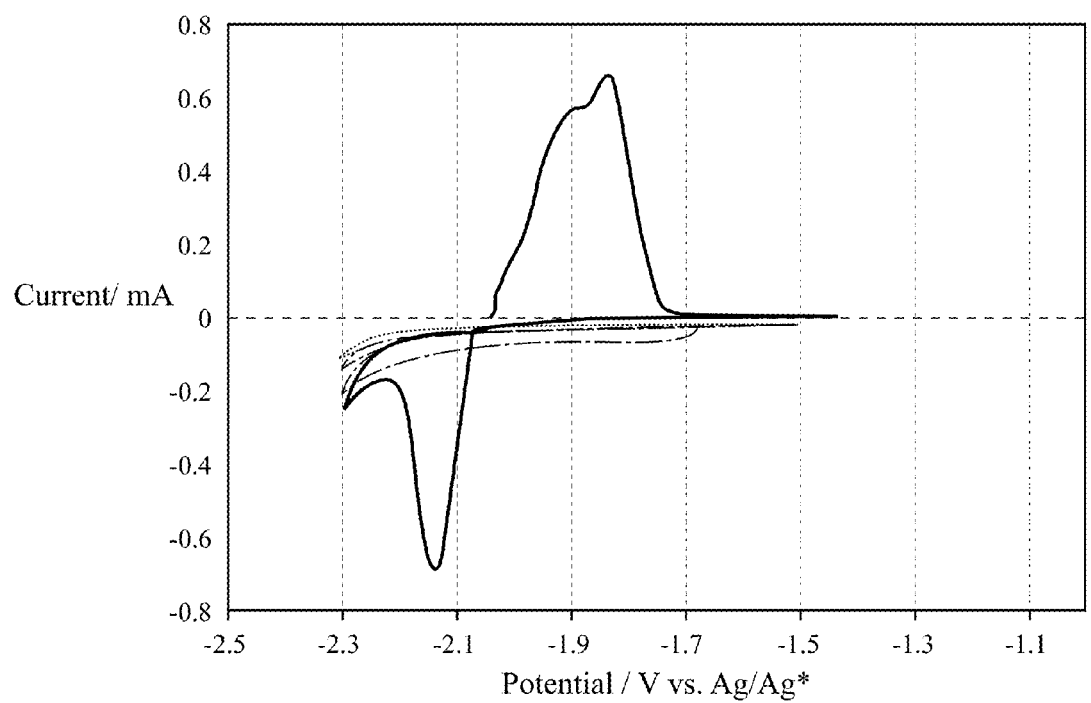
FIG. 5 is a slow scan cyclic voltammogram illustrating characteristics of an electrochemical cell incorporating an anode of bismuth alone relative to an anode with a $Mg_2Bi_3$ active material (identical to FIG. 4) according to one embodiment of the invention.

As a comparison, FIG. 5 illustrates a SSCV of an electrochemical cell constructed as in Example 2 with the exception that the anode is bismuth not pre-doped with magnesium. The SSCV of the control cell 20 is overlayed with the SSCV of the electrochemical cell that does include the $Mg_2Bi_3$ anode of Example 1 shown at 10. Relative to the cell including the $Mg_2Bi_3$ anode, a slight current reduction is observed but no clear peaks concerning Mg insertion/extraction process are present. This result proves that the initial doping process of Mg into bismuth is necessary to make the electrode reversible.

The invention is not restricted to the illustrative examples described above. Examples described are not intended to limit the scope of the invention. Changes therein, other combinations of elements, and other uses will occur to those skilled in the art. The scope of the invention is defined by the scope of the claims.

Various modifications of the present invention, in addition to those shown and described herein, will be apparent to those skilled in the art of the above description. Such modifications are also intended to fall within the scope of the appended claims.

It is appreciated that all reagents are obtainable by sources known in the art unless otherwise specified.

Patents and publications mentioned in the specification are indicative of the levels of those skilled in the art to which the invention pertains. These patents and publications are incorporated herein by reference to the same extent as if each individual application or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

I claim:

1. A magnesium battery comprising:
an anode comprising an active material, said anode free of surface oxidation;
a cathode;
an electrolyte disposed between the anode and cathode, the electrolyte including a magnesium compound, and said electrolyte in electrochemical contact with said anode and said cathode;
said active material including an inter-metallic compound of magnesium and bismuth.

2. The magnesium battery of claim 1 wherein the anode includes bismuth.

3. The magnesium battery of claim 1, wherein the cathode includes a cathode active material that shows electrochemical reaction at higher electrode potential than said anode.

4. The magnesium battery of claim 1 wherein the active material comprises $Mg_3Bi_2$.

5. The magnesium battery of claim 1 wherein the anode includes a binder, an electrically conducting material, and the active material.

6. The magnesium battery of claim 1 wherein the anode includes a binder, an electrically conducting material, and the active material, and wherein said active material is $Mg_3Bi_2$.

* * * * *